US010937242B2

(12) United States Patent
Chapman et al.

(10) Patent No.: US 10,937,242 B2
(45) Date of Patent: Mar. 2, 2021

(54) IMAGE COMPENSATION USING IMAGE ENHANCEMENT EFFECTS

(71) Applicant: Disney Enterprises, Inc., Burbank, CA (US)

(72) Inventors: Steven M. Chapman, Newbury Park, CA (US); Todd P. Swanson, Agoura Hills, CA (US); Joseph Popp, Cerritos, CA (US); Samy Segura, Glendale, CA (US); Mehul Patel, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 102 days.

(21) Appl. No.: 16/054,757

(22) Filed: Aug. 3, 2018

(65) Prior Publication Data

US 2020/0043235 A1 Feb. 6, 2020

(51) Int. Cl.
*G06T 19/00* (2011.01)
*G06T 7/73* (2017.01)
*G06F 3/00* (2006.01)
*G02B 27/01* (2006.01)

(52) U.S. Cl.
CPC ........ *G06T 19/006* (2013.01); *G02B 27/0172* (2013.01); *G02B 27/0179* (2013.01); *G06F 3/005* (2013.01); *G06T 7/75* (2017.01)

(58) Field of Classification Search
CPC ..... G06T 19/006; G06T 7/75; G02B 27/0179; G02B 27/0172; G06F 3/005
See application file for complete search history.

(56) References Cited

U.S. PATENT DOCUMENTS

| 7,362,918 B2 * | 4/2008 | Herley ...................... G06T 5/50 345/421 |
| 9,363,569 B1 * | 6/2016 | van Hoff ............ H04N 21/2668 |
| 2016/0217621 A1 * | 7/2016 | Raghoebardajal ... H04N 13/366 |

* cited by examiner

*Primary Examiner* — Chan S Park
*Assistant Examiner* — Elisa M Rice
(74) *Attorney, Agent, or Firm* — Farjami & Farjami LLP

(57) ABSTRACT

There are provided systems and methods for performing image compensation using image enhancement effects. In one implementation, such a system includes a computing platform having a hardware processor and a memory storing an image compensation software code. The hardware processor is configured to execute the image compensation software code to receive image data corresponding to an event being viewed by a viewer in a venue, the image data obtained by a wearable augmented reality (AR) device worn by the viewer, and to detect a deficiency in an image included in the image data. The hardware processor is further configured to execute the image compensation software code to generate one or more image enhancement effect(s) for compensating for the deficiency in the image and to output the image enhancement effect(s) for rendering on a display of the wearable AR device while the viewer is viewing the event.

20 Claims, 5 Drawing Sheets

IMAGE COMPENSATION USING IMAGE ENHANCEMENT EFFECTS

BACKGROUND

Augmented reality (AR), in which real world objects and/or environments are digitally modified using virtual imagery, offers the opportunity to provide entertainment experiences that are more immersive and engaging. AR can be used to modify images of the real world through augmentation. For example, a user viewing real world objects through AR glasses or using an AR headset can see some or all of those real world objects overlaid by virtual projections.

SUMMARY

There are provided systems and methods for performing image compensation using image enhancement effects, substantially as shown in and/or described in connection with at least one of the figures, and as set forth more completely in the claims.

DETAILED DESCRIPTION

Figure 1A:
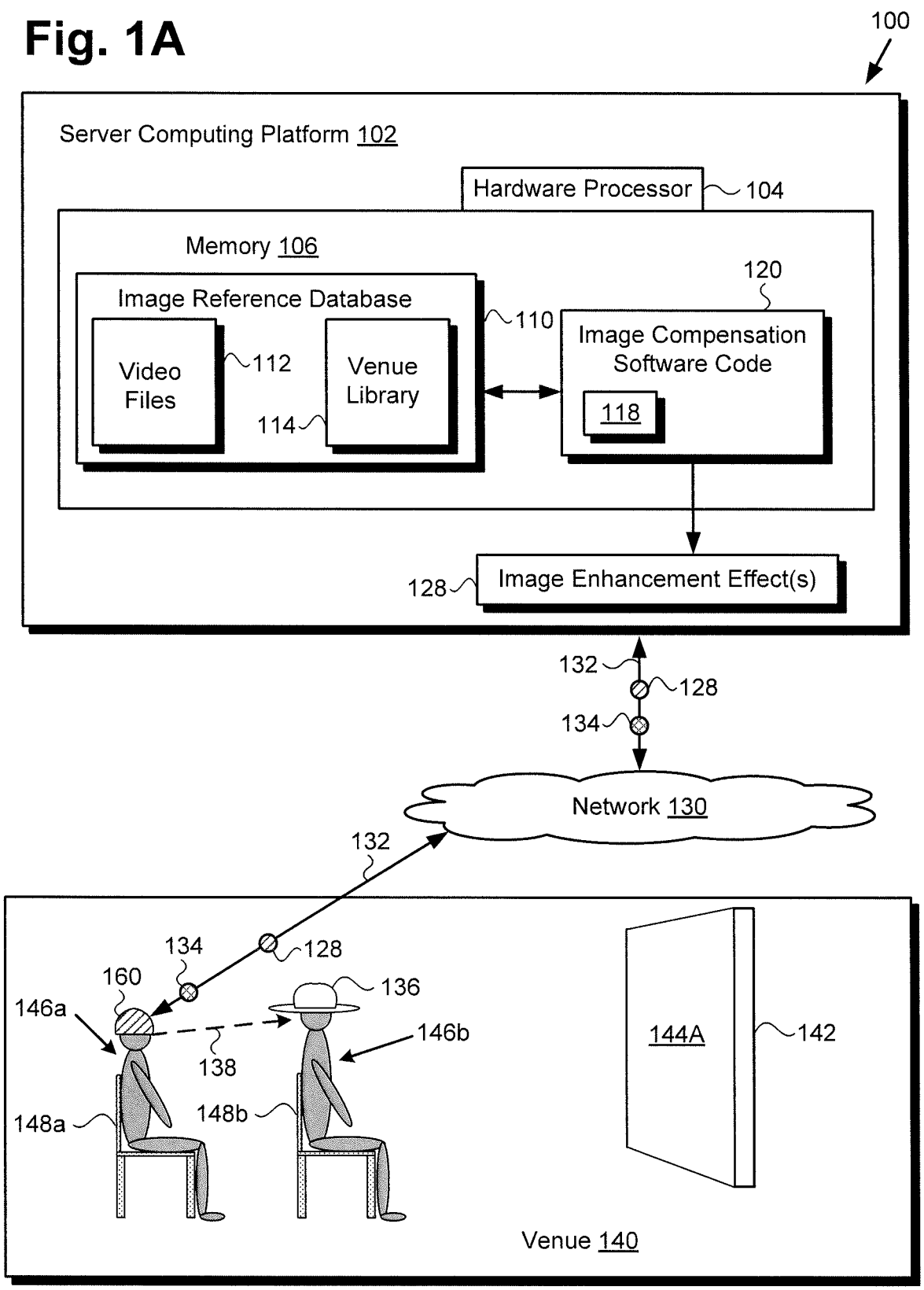
FIG. 1A shows a diagram of an exemplary system for performing image compensation using image enhancement effects, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The screening of a major motion picture, or the big screen presentation of an encore performance of an opera, concert, or sporting match, for example, can be an exciting and enjoyable event to attend. However, being present in a cinema, concert hall, sports stadium, or other event venue can impose its own constraints on enjoyment of the event. For example, the viewing perspectives from some seats in a movie theater, concert hall, or stadium are typically more advantageous for viewing an event than others. Moreover, some viewers of the event may have their view of the event obstructed by other attendees, or by undesirable features of the venue, such as architectural or other structural obstructions. System 100 of FIGS. 1A and 1B may perform image compensation using image enhancement effects to overcome existing issues in the art. Those image enhancement effects may be rendered on a display of a wearable augmented reality (AR) device worn by a viewer of an event while viewing the event. It is noted that, as used herein, the feature "image enhancement effect" refers to one or more virtual images used to overlay or merge with an image of a real world event viewed using the wearable AR device. Moreover, "image enhancement effect" refers to one or more virtual images in the form of environmental features, such as lighting, color, or structural/architectural features of a venue, or to simulations of persons, avatars, characters, caricatures of a person, animals, plants, and living things of various species or varieties, as well as inanimate objects.

FIG. 1A shows a diagram of an exemplary system for performing image compensation using image enhancement effects, according to one implementation. As shown in FIG. 1A, system 100 can include server computing platform 102 having hardware processor 104, and memory 106 implemented as a non-transitory storage device. According to the implementation shown in FIG. 1A, image compensation software code 120 and image reference database 110 are stored in memory 106. Image reference database 110 includes image files in the form of video files 112 and venue library 114. It is noted that, as also shown in FIG. 1A, image compensation software code 120, when executed by hardware processor 104, is configured to determine lookup table 118 and to generate image enhancement effect or effects 128 (hereinafter "image enhancement effect(s) 128").

As further shown in FIG. 1A, system 100 is implemented within a use environment including communication network 130 and wearable AR device 160. Wearable AR device 160 may be worn by viewer 146a of event 144A while viewer 146a views event 144A in venue 140. In addition, FIG. 1A shows network communication links 132 interactively connecting wearable AR device 160 and server computing platform 102 via communication network 130, exemplary movie screen 142 providing event 144A in the form of a cinematic film, seat 148a occupied by viewer 146a, and seat 148b occupied by other attendee 146b of event 144A wearing large hat 136. Also shown in FIG. 1A are image data 134, and viewing perspective 138 of viewer 146a, which is shown to be obstructed by other attendee 146b and/or large hat 136 worn by other attendee 146b.

It is noted that, although the present application refers to image compensation software code 120 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of server computing platform 102, or to a hardware processor of wearable AR device 160 (hardware processor of wearable AR device 160 not shown in FIG. 1A). Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1A depicts image compensation software code 120 and image reference database 110 as being co-located in memory 106, that representation is also provided merely as an aid to conceptual clarity. More generally, system 100 may include one or more computing platforms 102, such as computer servers for example, which may form an interactively linked but distributed system, such as a cloud based system, for instance. As a result, hardware processor 104 and memory 106 may correspond to distributed processor and memory resources within system 100.

According to one implementation corresponding to FIG. 1A, viewer 146a may utilize wearable AR device 160 to interact with server computing platform 102 of system 100 to enhance his/her enjoyment of event 144A while viewing event 144A in venue 140. That enhanced enjoyment may be provided due to image enhancement effect(s) 128 generated and output by image compensation software code 120, executed by hardware processor 104, as is described in greater detail below. Image enhancement effect(s) 128 may enable the enhanced enjoyment of event 144A by viewer 146a despite viewing perspective 138 of viewer 146a being obstructed by other attendee 146b to event 144A and/or by large hat 136 worn by other attendee 146b. In one such implementation, system 100 may correspond to one or more web servers, accessible over a packet-switched network such as the Internet, for example. Alternatively, system 100 may correspond to one or more computer servers supporting a local area network (LAN), or included in another type of limited distribution network.

In some implementations, venue 140 may take the form of an indoor venue. Such indoor venues may include a cinema, a theater, a concert hall, or an enclosed sports arena, to name a few examples. Alternatively, in some implementations, venue 140 may take the form of an outdoor venue. Outdoor venues corresponding to venue 140 may include an open air sports arena or stadium, a resort property, and a park, again to name merely a few examples.

It is noted that although event 144A is described as a cinematic film being shown on movie screen 142 by reference to FIG. 1A, that characterization is merely by way of example. More generally, event 144A may be any previously performed and pre-recorded artistic, sports, or entertainment event for which a corresponding video file included in video files 112 is stored in image reference database 110. Thus, in addition to a cinematic film, event 144A may be a pre-recorded sports match, concert, opera, or a pre-recorded performance of a dramatic or musical stage production, for example.

Figure 1B:
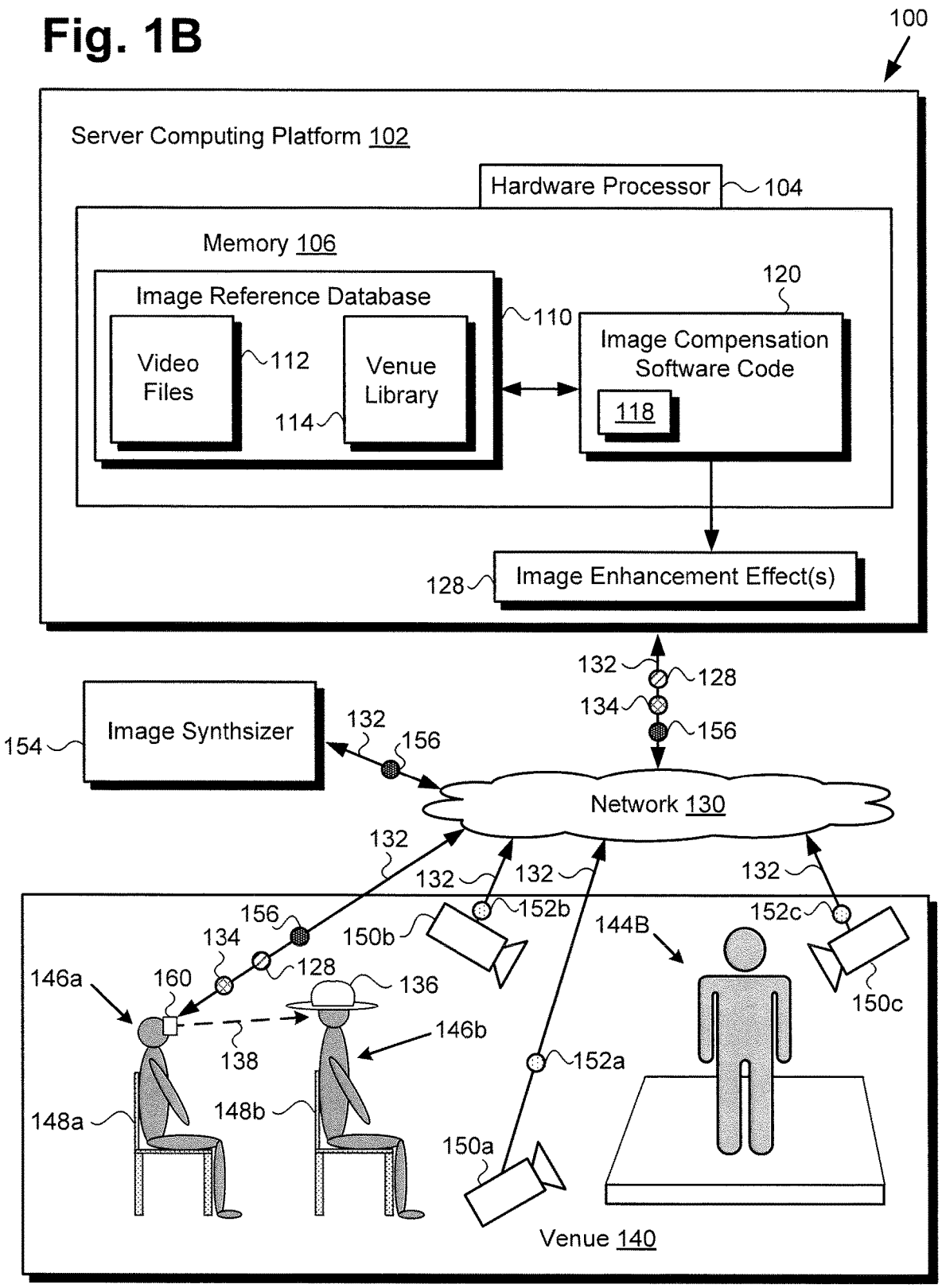
FIG. 1B shows a diagram of an exemplary system for performing image compensation using image enhancement effects, according to another implementation.

FIG. 1B shows a diagram of exemplary system 100 for performing image compensation using image enhancement effects, according to another implementation. It is noted that system 100, in FIG. 1B, corresponds in general to system 100, in FIG. 1A, and may share any of the characteristics attributed to that corresponding system by the present disclosure. It is further noted that any other feature in FIG. 1B identified by a reference number identical to a reference number appearing in FIG. 1A corresponds to that previously described feature and may share any of the characteristics attributed to it above.

As shown in FIG. 1B, in addition to the features shown in FIG. 1A, the use environment in which system 100 is implemented in FIG. 1B further includes one or more cameras 150a, 150b, 150c situated in various locations in venue 140 and generating camera data 152a, 152b, and 152c, respectively. Also shown in FIG. 1B is image synthesizer 154 receiving camera data 152a, and/or 152b, and/or 152c from respective one or more cameras 150a, 150b, and 150c, and producing reference images 156 based on one or more of camera data 152a, 152b, and 152c.

Cameras 150a, 150b, 150c may be light field cameras, for example. That is to say, in some implementations, cameras 150a, 150b, and 150c may be configured to obtain information about the light field emanating from event 144B. That light field information, which may include the directions that light rays emanating from event 144B are traveling, as well as the intensity of the light emanating from event 144B, may be transmitted to image synthesizer 154 as camera data 152a, 152b, and 152c. Image synthesizer may then be configured to produce reference images 156 depicting event 144B.

According to the exemplary implementation shown in FIG. 1B, and in contrast to the implementation shown in FIG. 1A, event 144B may be a live event, such as an artistic, sports, or entertainment event for which a corresponding video file is not included among video files 112 stored in image reference database 110. In the exemplary implementation of FIG. 1B, image synthesizer 154 is configured to provide reference images 156 depicting event 144B in real-time with respect to the performance of live event 144B.

Figure 2:
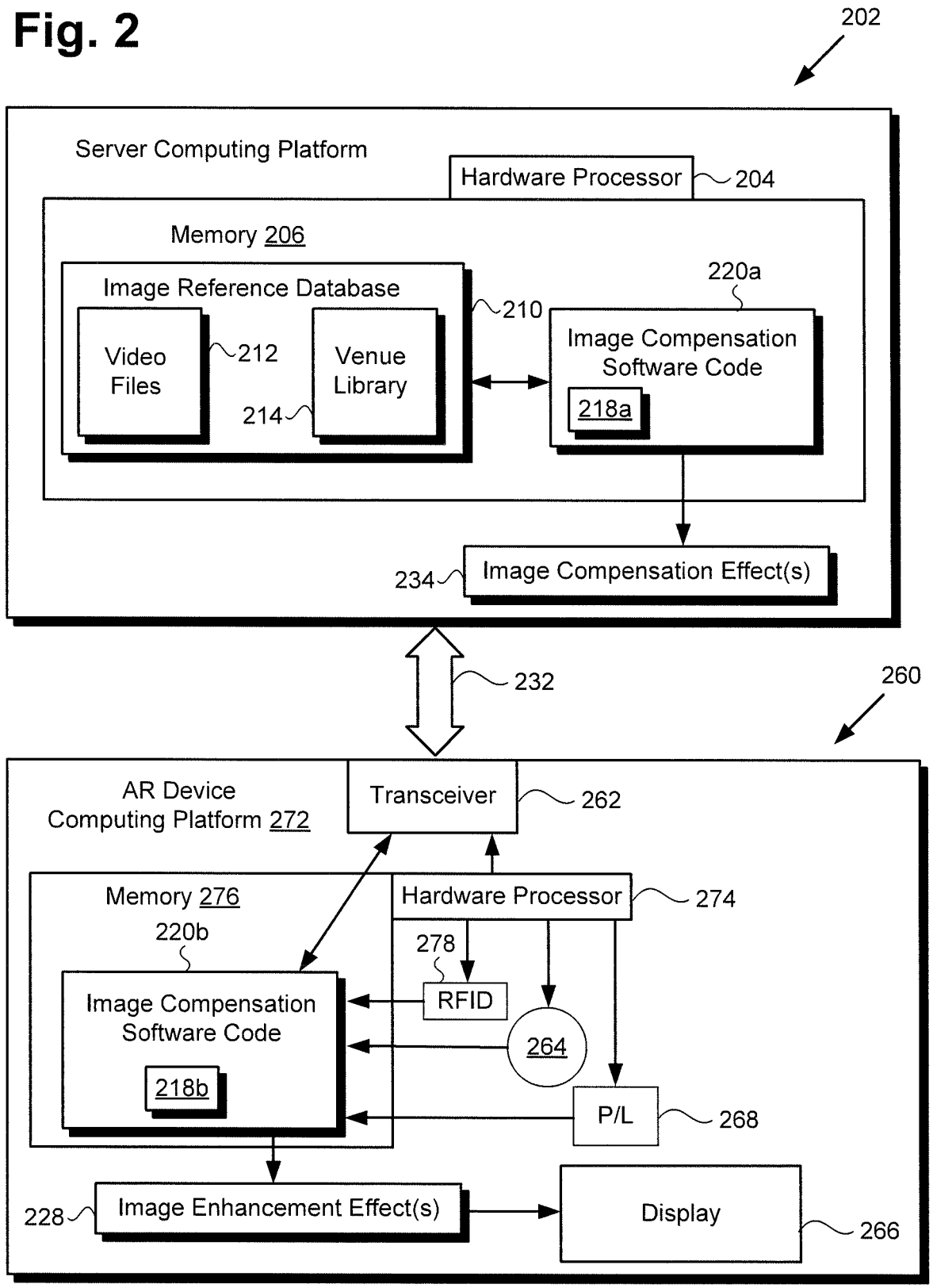
FIG. 2 shows a diagram including a more detailed exemplary representation of a wearable augmented reality (AR) device for use in performing image compensation using image enhancement effects, according to one implementation.

FIG. 2 shows a more detailed representation of exemplary wearable AR device 260 in combination with server computing platform 202. As shown in FIG. 2, wearable AR device 260 is communicatively coupled to server computing platform 202 over network communication link 232. Server computing platform 202 includes hardware processor 204, and memory. As further shown in FIG. 2, memory 206 contains image compensation software code 220a including lookup table 218a, and image reference database 210 storing image files, such as video files 212 and venue library 214.

Wearable AR device 260 includes AR device computing platform 272 having hardware processor 274 and memory 276 implemented as a non-transitory storage device storing image compensation software code 220b, which may include lookup table 218b. As also shown in FIG. 2, wearable AR device 260 may include any or all of transceiver 262, camera 264, radio-frequency identification (RFID) reader 278, position/location sensor 268, and display 266 receiving image enhancement effect(s) 228 from image compensation software code 220b.

Wearable AR device 260 corresponds in general to wearable AR device 160, in FIGS. 1A and 1B, and those corresponding features may share any of the characteristics attributed to either corresponding feature by the present disclosure. Thus, like wearable AR device 260, wearable AR device 160 may include features corresponding to AR device computing platform 272 including hardware processor 274, transceiver 262, camera 264, RFID reader 278, position/location sensor 268, display 266, and memory 276 storing image compensation software code 220b.

It is noted that wearable AR device 160/260 can take a variety of forms. For example, in some implementations, wearable AR device 160/260 may be implemented as AR glasses. In other implementations, wearable AR device 160/260 may take the form of AR goggles. Moreover, in yet other implementations, wearable AR device 160/260 may take the form of an AR headset.

Transceiver 262 may be implemented as a wireless communication unit enabling wearable AR device 160/260 to exchange data with server computing platform 202 via network communication link 232. For example, transceiver 262 may be implemented as a 4G wireless transceiver, or as a 5G wireless transceiver configured to satisfy the IMT-2020 requirements established by the International Telecommunication Union (ITU).

Camera 264 may include a red-green-blue (RGB) still image camera and/or video camera. Moreover, in some implementations, camera 264 may correspond to an array of RGB still image and/or video cameras configured to generate a panoramic image of an event venue, such as venue 140.

Display 266 may take the form of a single display screen, or multiple display screens, e.g., individual lenses of wearable AR device 160/260 when implemented as AR glasses or goggles. Display 266 including one or more display screens may be implemented as a liquid crystal display (LCD), a light-emitting diode (LED) display, an organic light-emitting diode (OLED) display, or another suitable display screen that performs a physical transformation of signals to light.

Position/location sensor(s) 268 may include one or more accelerometers, and/or gyroscopes, and/or a GPS receiver, and/or a magnetometer, for example. In some implementations, position/location sensor(s) 268 may be implemented as an inertial measurement unit (IMU), as known in the art.

Network communication link 232 and server computing platform 202 having hardware processor 204 and memory 206, correspond in general to network communication links 132 and server computing platform 102 having hardware processor 104 and memory 106, in FIGS. 1A and 1B. In addition, image compensation software code 220a, and image reference database 210 storing video files 212 and venue library 214, in FIG. 2, correspond respectively in general to image customization software code 110, and image reference database 110 storing video files 112 and venue library 114, in FIGS. 1A and 1B. In other words, image compensation software code 220a and image reference database 210 storing video files 212 and venue library 214 may share any of the characteristics attributed to respectively corresponding image compensation software code 120 and image reference database 110 storing video files 112 and venue library 114 by the present disclosure, and vice versa.

It is noted that image enhancement effect(s) 228, in FIG. 2, correspond in general to image enhancement effect(s) 128, in FIG. 1. Consequently, image enhancement effect(s) 228 may share any of the characteristics attributed to image enhancement effect(s) 128 by the present disclosure, and vice versa.

With respect to image compensation software code 220b, it is noted that in some implementations, image compensation software code 220b may be a thin client application of image compensation software code 120/220a. In those implementations, image compensation software code 220b may enable wearable AR device 160/260 to provide image data 134 to server computing platform 102/202 for processing, and to output image enhancement effect(s) 128/228 for rendering on display 266. Moreover, in those implementations, image compensation software code 220b may not include lookup table 218b.

However, in other implementations, image compensation software code 220b may include all of the features of image compensation software code 120/220a, and may be capable of executing all of the same functionality. That is to say, in some implementations, image compensation software code 220b corresponds to image compensation software code 120/220a and may share any of the features and perform any of the processes attributed to those corresponding features by the present disclosure. Thus, in some implementations, system 100 is integrated with wearable AR device 160/260.

Furthermore, and as shown in FIG. 2, in implementations in which image compensation software code 220b corresponds to image compensation software code 120/220a, image compensation software code 220b includes lookup table 218b. It is also noted that lookup table 218b corresponds in general to lookup table 118/218a, and may share any of the characteristics attributed to that corresponding feature by the present disclosure.

According to the exemplary implementation shown in FIG. 2, image compensation software code 220b is located in memory 276, having been received via network communication link 132/232, either from server computing platform 102/202 or an authorized third party source of image compensation software code 220b. In one implementation, network communication link 132/232 corresponds to transfer of image compensation software code 220b over a packet-switched network, for example. Once transferred, for instance by being downloaded over network communication link 132/232, image compensation software code 220b may be persistently stored in memory 276 of AR device computing platform 272, and image compensation software code 220b may be executed locally on wearable AR device 160/260 by hardware processor 274.

Hardware processor 274 may be the central processing unit (CPU) for wearable AR device 160/260, for example, in which role hardware processor 274 runs the operating system of wearable AR device 160/260 and executes image compensation software code 220b. As noted above, wearable AR device 160/260 can utilize image compensation software code 220b, either as a thin client application or as a software module having all of the features and functionality of image compensation software code 120/220a, to output image enhancement effect(s) 128/228 for rendering on display 266.

Figure 3:
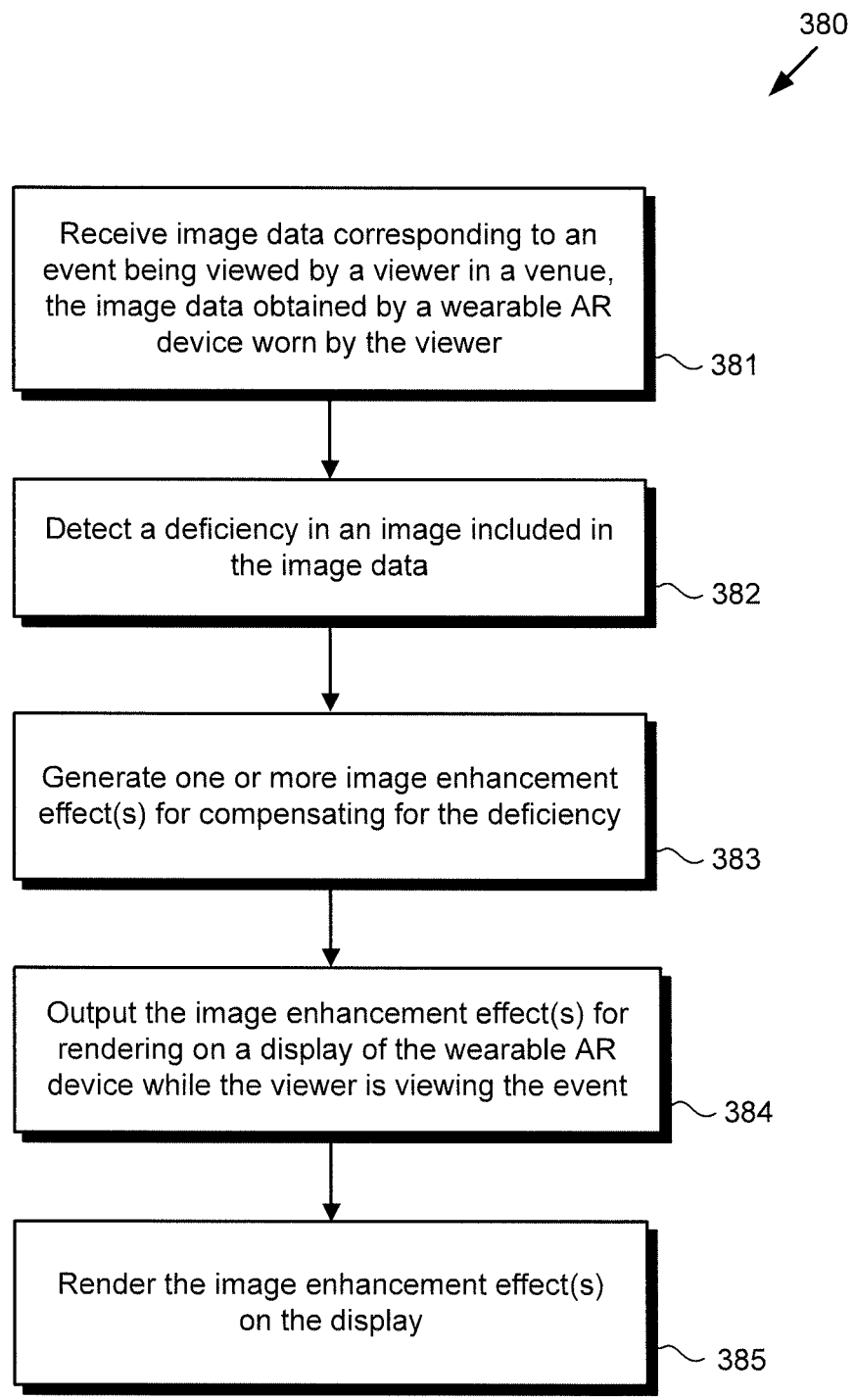
FIG. 3 is a flowchart presenting an exemplary method for use by a system to perform image compensation using image enhancement effects.

The functionality of image compensation software code 120/220a/220b will be further described by reference to FIG. 3 in combination with FIGS. 1A, 1B, 2, and 4. FIG. 3 shows flowchart 380 presenting an exemplary method for use by a system to perform image compensation using image enhancement effects. With respect to the method outlined in FIG. 3, it is noted that certain details and features have been left out of flowchart 380 in order not to obscure the discussion of the inventive features in the present application.

Figure 4:
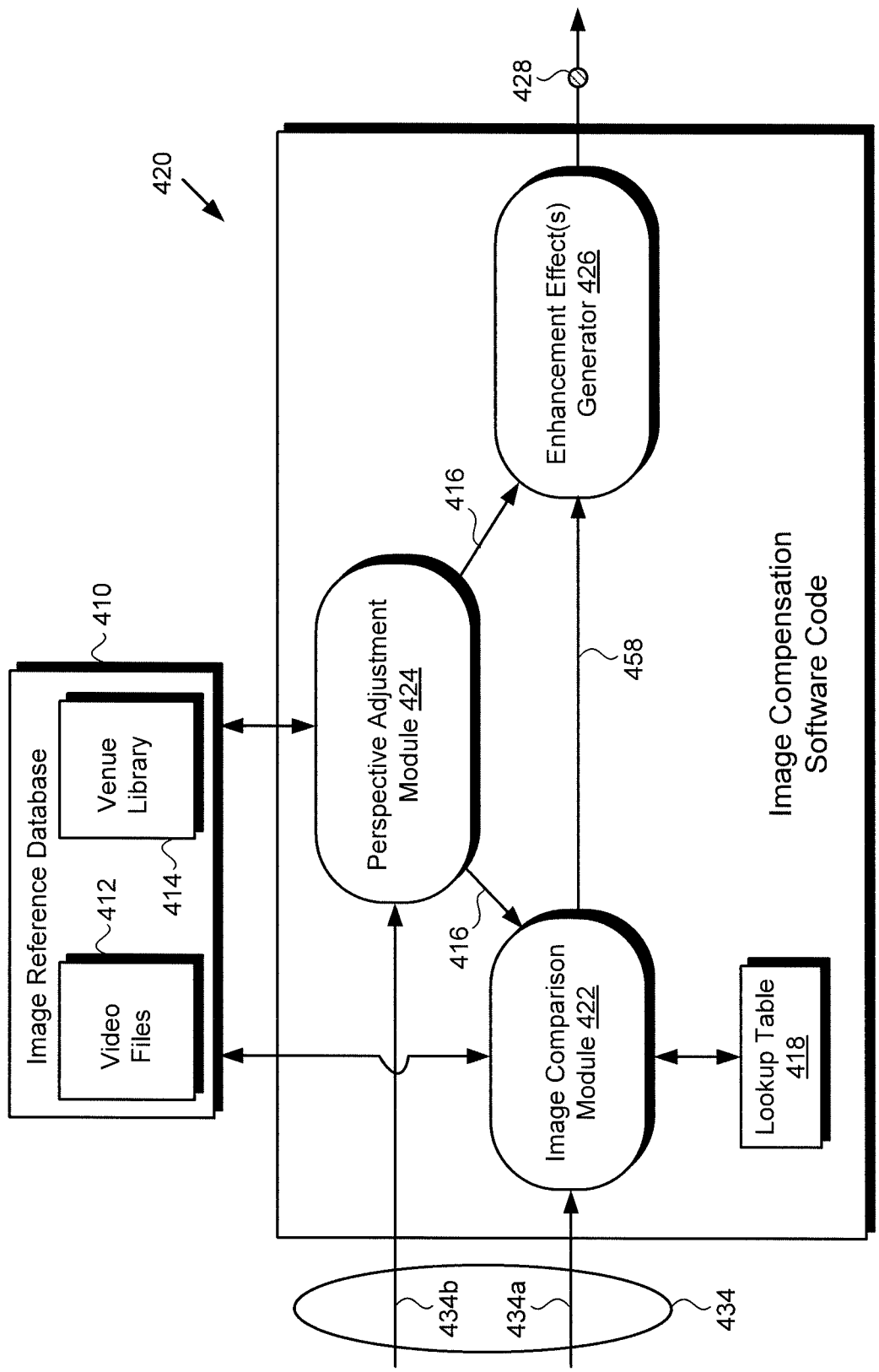
FIG. 4 shows an exemplary diagram of an image compensation software code suitable for execution by a hardware processor to perform image compensation using image enhancement effects, according to one implementation.

FIG. 4 shows an exemplary diagram of image compensation software code 420 suitable for execution by a hardware processor of the systems shown by FIGS. 1A, 1B, and 2, according to one implementation. As shown in FIG. 4, image compensation software code 420 may include image comparison module 422, perspective adjustment module 424, lookup table 418, and enhancement effect(s) generator 426. In addition, FIG. 4 shows image data 434 including image 434a and perspective data 434b, perspective correction 416, deficiency 458 detected in image 434a, and image enhancement effect(s) 428. Also shown in FIG. 4 is image reference database 410 storing video files 412 and venue library 414.

Image data 434 corresponds in general to image data 134, in FIGS. 1A and 1B, and those corresponding features may share any of the characteristics attributed to either corresponding feature by the present disclosure. In other words, like image data 434, image data 134 may include image 434a and perspective data 434b.

Image enhancement effect(s) 428 correspond in general to image enhancement effect(s) 128/228, in FIGS. 1A, 1B, and 2, and may share any of the characteristics attributed to that corresponding feature by the present disclosure. Moreover, image compensation software code 420 corresponds in general to image compensation software code 120/220a/220b, in FIGS. 1A, 1B, and 2, while lookup table 418 corresponds to lookup table 118/218a/218b in those figures. That is to say, like image compensation software code 420, image compensation software code 120/220a/220b may include modules corresponding to image comparison module 422, perspective adjustment module 424, and enhancement effect(s) generator 426, in addition to lookup table 118/218a/218b.

Image reference database 410 storing video files 412 and venue library 414 corresponds in general to image reference database 110/210 storing video files 112/212 and venue library 114/214, in FIGS. 1A, 1B, and 2. Consequently, image reference database 410, video files 412, and venue library 414 may share any of the characteristics attributed to image reference database 110/210, video files 112/212, and venue library 114/214 by the present disclosure, and vice versa. It is noted that, in implementations in which the method outlined by flowchart 380 is performed by image compensation software code 220b/420, executed locally on AR device 160/260 by hardware processor 274, image reference database 110/210/410 may be accessible to image compensation software code 220b/420 via communication network 130 and network communication link(s) 132/232.

Referring to FIG. 3 in combination with FIGS. 1A, 1B, 2, and 4, flowchart 380 begins with receiving image data 134/434 corresponding to event 144A/144B being viewed by viewer 146a in venue 140, image data 134/434 obtained by wearable AR device 160/260 worn by viewer 146a (action 381). As noted above, wearable AR device 160/260 may include camera 264 and position/location sensor 268. Thus, in some implementations, image data 134/434 may include image 434a obtained using camera 264, and perspective data 434b obtained using position/location sensor 268. Perspective data 268 may include the location of viewer 146a wearing AR device 160/260 within venue 140, as well as a head position and orientation of viewer 146a, for example.

In some implementations, image data 134/434 may be obtained using wearable AR device 160/260, and may be subsequently transmitted to server computing platform 102/202 via communication network 130 and network communication link(s) 132/232. In those implementations image data 134/434 may be received from wearable AR device 160/260 by image compensation software code 120/220a/420, executed by hardware processor 104/204. For example, as shown in FIG. 4, image 434a of image data 134/434 may be received by image comparison module 422 of image compensation software code 120/220a/420, while perspective data 434b may be received by perspective adjustment module 424.

Alternatively and as also noted above, in some implementations, image compensation software code 220b/420 may be stored locally on memory 276 of wearable AR device 160/260. In those implementations, image data 134/434 may be received from camera 264 and position/location sensor 268 of wearable AR device 160/260, for example, by image compensation software code 220b/420, executed by hardware processor 274, and using image comparison module 422 and perspective adjustment module 424, as stated above.

Flowchart 380 continues with detecting deficiency 458 in image 434a included in image data 134/434 (action 382). Detection of deficiency 458 in image 434a may include approximating the viewing distortion experienced by viewer 146a while viewing event 144A/144B using wearable AR device 160/260. Such an approximation may be based on a parallax of the viewing angle of viewer 146a, for example. In implementations in which venue 140 is a cinema, for instance, a calibration screen may be shown on movie screen 142 prior to the beginning of event 144A. Such a calibration screen may show a calibration landmark, or may include watermarks on the corners of movie screen 142 that may be captured by camera 264 and be included in image data 134/434.

In some implementations, approximating the viewing distortion experienced by viewer 146a may include obtaining a map or seating chart of venue 140 from venue library 114/214/414 of image reference database 110/210/410. For example, in one implementation, perspective data 434b of image data 134/434 may include data enabling identification of seat 148a occupied by viewer 146a. As a specific example, seat 148a may include an RFID tag that can be scanned using RFID reader 278 of wearable AR device 160/260. Identification of seat 148a in venue 140 occupied by viewer 146a, in combination with a seating chart or map for venue 140 obtainable from venue library 114/214/414, may further enable approximation of the viewing distortion experienced by viewer 146a wearing wearable AR device 160/260.

In some implementations, approximation of the viewing distortion experienced by viewer 146a may be performed by image compensation software code 120/220a/420, executed by hardware processor 104/204 of server computing platform 102/202, and using perspective adjustment module 424 to produce perspective correction 416. Alternatively, in some implementations, approximation of the viewing distortion experienced by viewer 146a may be performed by image compensation software code 220b/420, executed by hardware processor 274 of wearable AR device 160/260, using perspective adjustment module 424 to produce perspective correction 416.

In implementations in which event 144A is a previously performed and pre-recorded artistic, sports, or entertainment event for which a corresponding video file is included in video files 112/212/412, detection of deficiency 458 in image 434a may be performed based on a comparison with the corresponding video file. For example, where image 434a corresponds to a frame of one of video files 112/212/412, image 434a can be compared to its corresponding frame from video files 112/212/412.

In the specific exemplary use case in which event 144A is the screening of a movie, a random set of pixels may be selected from image 434a of event 144A, obtained by camera 264 of wearable AR device 160/260. Those selected pixels can be compared to the video file of the movie stored as one of video files 112/212/412 for correspondences.

A correspondence lookup table for image 434a obtained by camera 264 is satisfied if sufficient pixels from image 434a agree with video image data included in one or more frames of the video file. More samples are used to repeat the correspondence process, as many times as is allowed by the available computing power. In some implementations, the one or more video frames used in the correspondence process can by selected from the video file based on timestamps, or a timecode of the video file. Alternatively, or in addition, in some implementations, the one or more video frames used in the correspondence process can by selected from the video file using image comparison techniques.

The result is one-to-one per pixel lookup table 118/218/418 showing where the movie's pixels are landing within viewing perspective 138 of viewer 146a. Lookup table 118/218/418 will be missing samples that have been obscured by structural features of venue 140, other attendee 146b of event 144A, large hat 136 worn by other attendee 146b, or projection shadows, i.e., "Rabbit's Foot", for example. It is noted that the samples missing from lookup table 118/218/418 are defined herein as "outliers." Thus, using lookup table 118/218/418, it can be determined which image elements or pixels are outliers of the correspondence process with respect to viewing perspective 138 of viewer 146a, thereby enabling detection of deficiency 458.

Deficiency 458 in image 434a may take a variety of forms. In some implementations, deficiency 458 may be a degraded portion of image 454a due to missing image elements or pixels. As noted above, those image elements or pixels may be missing from image 454a as a result of viewing perspective 318 of viewer 146a being at least partially obstructed by structural features of venue 140, other attendee 146b of event 144A, and/or large hat 136 worn by other attendee 146b.

As further noted above, where event 144A is a prerecorded event, deficiency 458 in image 434a may be detected through comparison of image 434a with a video file of event 144A obtained from video files 112/212/412 stored in image reference database 110/210/410. As discussed above by reference to FIG. 1B, in some implementations, event 144B may be a live event. In those implementations, image 434a may be a live image obtained during live event 144B. Moreover, in those implementations, detection of deficiency 458 may be performed through a comparison of image 434a with a corresponding image from reference images 156. As also noted above, in those implementations, reference images 156 may be produced by image synthesizer 154 based on one or more of camera data 152a, 152b, and 152c.

In some other implementations, deficiency 458 in image 434a may be the appearance of an undesirable feature of venue 140 in image 434a. For example, deficiency 458 may be the unsightly appearance in image 434a of exposed pipes, or ventilation ducts or panels present in venue 140. In those implementations, detection of deficiency 458 may be performed through a comparison of image 434a with a three-dimensional (3D) model of venue 140 from which the undesirable features have been extracted. Such a 3D model of venue 140 may be obtainable from venue library 114/214/414, for example.

According to some implementations, deficiency 458 in image 434a may be light intrusion. In some of those implementations, light intrusion deficiency 458 in image 434a may be due to otherwise desirable features of venue 140. For example, deficiency 458 may be due to door seal light leaks, glare from projection or lighting equipment, or even exit lighting. In those implementations, detection of deficiency 458 may be performed through a comparison of image 434a with a 3D model of venue 140 in which those light sources are obscured. Such a 3D model of venue 140 may be obtainable from venue library 114/214/414, for example.

In other implementations in which deficiency 458 in image 434a is light intrusion, that light intrusion may be due to spurious light produced by the actions of other attendees to event 144A/144B, such as other attendee 146b. For example, where venue 140 is a cinema darkened for screening of event 144A in the form of a movie, mobile phone use by other attendee 146b may generate undesirable spurious light during viewing of event 144A by viewer 146a. In those implementations, image 434a may be compared with a video file of event 144A obtained from image reference database 110/210/410, and the higher light levels in image 434a when compared to the corresponding video file image may be detected as deficiency 458. Alternatively, or in addition, a mobile phone appearing as a light source in image 434a may be identified as not falling within the geometric bounds of the movie frame.

As noted above, in some implementations, image data 134/434 including image 434a and perspective data 434b may be received from wearable AR device 160/260 by server computing platform 102/202. In those implementations, deficiency 458 in image 434a may be detected by image compensation software code 120/220a/420, executed by hardware processor 104/204, and using image comparison module 422 and lookup table 118/218/418. Alternatively and as also noted above, in some implementations, image compensation software code 220b/420 may be stored locally on memory 276 of wearable AR device 160/260. Thus, in some implementations, deficiency 458 in image 434a may be detected by image compensation software code 220b/420, executed by hardware processor 274, and using image comparison module 422 and lookup table 118/218/418.

Flowchart 380 continues with generating image enhancement effect(s) 128/228/428 for compensating for deficiency 458 (action 383). Image enhancement effect(s) 128/228/428 may take many different forms, depending on the type of deficiency 458 detected in image 434a. For example, in cases where deficiency 458 is degradation of image 434a due to obstruction of viewing perspective 138 of viewer 146a, image enhancement effect(s) 128/228/428 may include imagery to effectively fill-in the missing portion of image 434a so as to substantially match image 434a with its corresponding image in video files 112/212/412 or with its corresponding image among reference images 156 produced by image synthesizer 154. That is to say, in implementations in which image 434a is missing a set of pixel samples, generating image enhancement effect(s) 128/228/428 may include generating an AR image based on the set of missing pixel samples.

In cases where deficiency 458 is the appearance of an undesirable feature of venue 140 in image 434a, and/or intrusive lighting produced by lighting features of venue 140, image enhancement effect(s) 128/228/428 may include masking those undesirable features and/or lighting features in image 434a so as to harmonize image 434a with a corresponding 3D model of venue 140 obtained from venue library 114/214/414. Where deficiency 458 is light intrusion due to spurious light generated by other attendee 146b, through use of a mobile phone, for example, image enhancement effect(s) 128/228/428 may include obscuring the offending mobile phone or other spurious light source.

In some use cases, image enhancement effects 128/228/428 may be adjusted to substantially match viewing perspective 138 of viewer 146a while viewer 146a views event 144A/144B. For example, as discussed above, the viewing distortion experienced by viewer 146a due to the location and head position or orientation of viewer 146a may be approximated using perspective adjustment module 424, resulting in perspective correction 416. Thus, in some implementations perspective correction 416 may be used to adjust image enhancement effects 128/228/428 to substantially match image viewing perspective 138 of viewer 146a while viewer 146a views event 144A/144B.

According to some implementations, image enhancement effect(s) 128/228/428 may be generated by image compensation software code 120/220a/420, executed by hardware processor 104/204, and using enhancement effect(s) generator 426. Alternatively image enhancement effect(s) 128/228/

428 may be generated by image compensation software code 220b/420, executed by hardware processor 274 of wearable AR device 160/260, and using enhancement effect(s) generator 426.

It is noted that in implementations in which exit or other emergency lighting in venue 140 is masked by image enhancement effect(s) 128/228/428, that masking may be automatically terminated by image compensation software code 120/220a/220b/420 during an emergency or another significantly disruptive occurrence, such as a power outage, for example. Moreover, in some implementations, image enhancement effect(s) 128/228/428 may be generated by image compensation software code 120/220a/220b/420 to enhance or amplify exit or other emergency lighting in venue 140 during an emergency or other significantly disruptive occurrence.

Flowchart 380 continues with outputting image enhancement effect(s) 128/228/428 for rendering on display 266 of wearable AR device 160/260 while viewer 146a is viewing event 144A/144B (action 384). In some implementations, outputting of image enhancement effect(s) 128/228/428 for rendering on display 266 while viewer 146a is viewing event 144A/144B may be performed by image compensation software code 120/220a/420, executed by hardware processor 104/204. For example, in those implementations, image enhancement effect(s) 128/228/428 generated on server computing platform 102/202 in action 383 may be sent to wearable AR device 160/260 via communication network 130 and network communication link(s) 132/232 while viewer 146a is viewing event 144A/144B.

For example, where image enhancement effect(s) 128/228/428 include(s) an AR image generated based on a set of pixel samples missing from image 434a, outputting image enhancement effect(s) 128/228/428 can include sending the AR image to wearable AR device 160/260. Alternatively, outputting of image enhancement effect(s) 128/228/428 for rendering on display 266 while viewer 146a is viewing event 144A/144B may be performed by image compensation software code 220b/420, executed by hardware processor 274 of wearable AR device 160/260.

Exemplary flowchart 380 can conclude with rendering image enhancement effect(s) 128/228/428 on display 266 of wearable AR device 160/260 (action 385). Rendering of image enhancement effect(s) 128/228/428 on display 266 of wearable AR device 160/260 may be performed by image compensation software code 220b/420, executed by hardware processor 274 of wearable AR device 160/260.

It is noted that image data 134/434 may be received in action 381 and image enhancement effect(s) 128/228/428 may be output in action 384 and/or rendered in action 385 in real-time with respect to presentation or performance of event 144A/144B. For example, there may be a single frame of delay in rendering image enhancement effect(s) 128/228/428 on display 266 of wearable AR device 160/260 due to obtaining image data 134/434, processing image data 134/434, and updating display 266 with image enhancement effect(s) 128/228/428.

In some implementations, even that slight latency can be reduced through prediction of the temporal and spatial movement of the head of viewer 146a. Such a prediction may be based on a record of viewing perspectives 138 of viewer 146a during previously viewed frames of event 144A/144B, e.g., frames corresponding to frames of video files 112/212/412 or frames corresponding to frames of reference images 156, and may be performed using a conventional deep-optical flow prediction algorithm. That latency solution will be least effective when viewer 146a is moving abruptly and perhaps not paying close attention to event 144A/144B. Under those conditions, however, any artifacts visible on edge-condition pixels of image 434a may advantageously go unnoticed by viewer 146a.

Thus, the present application discloses systems and methods for performing image compensation using image enhancement effects. The present image compensation solution utilizes image data obtained by a wearable AR device and corresponding to an event being viewed by a viewer in a venue to detect a deficiency in an image included in the image data. In addition, the present image compensation solution generates one or more image enhancement effects for compensating for the deficiency in the image. The present solution further outputs the image enhancement effect(s) for rendering on a display of the wearable AR device while the viewer is viewing the event, thereby enhancing the experience of the viewer during the event.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform including a hardware processor and a memory storing an image compensation software code;
wherein the hardware processor is configured to execute the image compensation software code to:
receive a first image data corresponding to an event being viewed by a viewer in a venue, the first image data obtained by a wearable augmented reality (AR) device worn by the viewer;
compare the first image data with a second image data including at least one structural feature of a model of the venue;
detect a portion of the event is degraded or obstructed for viewing by the viewer, based on comparing the first image data with the second image data including the at least one structural feature of the model of the venue;
generate an AR image based on the portion of the event that is degraded or obstructed for viewing by the viewer; and
output the AR image for rendering on a display of the wearable AR device while the viewer is viewing the event.

2. The system of claim 1, wherein, to detect the portion of the event that is degraded or obstructed for viewing by the viewer, the hardware processor is further configured to execute the image compensation software code to:
select a random set of first pixels from the first image data;
perform a correspondence process between the random set of first pixels and second pixels from the second image data; and
determine outliers of the correspondence process to detect the portion of the event that is degraded or obstructed for viewing by the viewer.

3. The system of claim 2, wherein the hardware processor is further configured to execute the image compensation software code to:
- generate, based on the correspondence process, a per-pixel lookup table matching the second pixels of the second image data to the first pixels in the first image data; and
- determine, using the per-pixel lookup table, one or more pixels present in the second image data but missing from the first image data;
- wherein the AR image is generated based on the one or more pixels.

4. The system of claim 1, wherein the hardware processor is further configured to execute the image compensation software code to receive the first image data and to output the AR image in real-time with respect to a presentation of the event.

5. The system of claim 1, wherein the event is a pre-recorded event.

6. The system of claim 1, wherein the event is a live event and the first image data is a live image obtained during the live event.

7. The system of claim 1, wherein the system is integrated with the wearable AR device, and wherein the hardware processor is further configured to execute the image compensation software code to render the AR image on the display.

8. The system of claim 1, wherein the wearable AR device comprises AR glasses, AR goggles, or an AR headset.

9. The system of claim 1, wherein the model of the venue is a three-dimensional (3D) model obtained from a venue model library.

10. The system of claim 1, wherein the AR image masks the portion of the event that is degraded or obstructed so as to substantially match the first image with the second image.

11. A method for use by a system including a computing platform having a hardware processor and a memory storing an image compensation software code, the method comprising:
- receiving, by the image compensation software code executed by the hardware processor, a first image data corresponding to an event being viewed by a viewer in a venue, the first image data obtained by a wearable augmented reality (AR) device worn by the viewer;
- comparing, by the image compensation software code executed by the hardware processor, the first image data with a second image data including at least one structural feature of a model of the venue;
- detecting, by the image compensation software code executed by the hardware processor, a portion of the event is degraded or obstructed for viewing by the viewer, based on comparing the first image data with the second image data including the at least one structural feature of the model of the venue;
- generating, by the image compensation software code executed by the hardware processor, an AR image based on the portion of the event that is degraded or obstructed for viewing by the viewer; and
- outputting, by the image compensation software code executed by the hardware processor, the AR image for rendering on a display of the wearable AR device while the viewer is viewing the event.

12. The method of claim 11, wherein detecting the portion of the event that is degraded or obstructed for viewing by the viewer comprises:
- selecting, by the image compensation software code executed by the hardware processor, a random set of first pixels from the first image data;
- performing, by the image compensation software code executed by the hardware processor, a correspondence process between the random set of first pixels and second pixels from the second image data; and
- determining, by the image compensation software code executed by the hardware processor, outliers of the correspondence process to detect the portion of the event that is degraded or obstructed for viewing by the viewer.

13. The method of claim 12, further comprising:
- generating, based on the correspondence process, by the image compensation software code executed by the hardware processor, a per-pixel lookup table matching the second pixels of the second image data to the first pixels in the first image data; and
- determining, using the per-pixel lookup table, by the image compensation software code executed by the hardware processor, one or more pixels present in the second image data but missing from the first image data;
- wherein the AR image is generated based on the one or more pixels.

14. The method of claim 11, wherein receiving the first image data and to output the AR image in real-time with respect to a presentation of the event.

15. The method of claim 11, wherein the event is a pre-recorded event.

16. The method of claim 11, wherein the event is a live event and the first image data is a live image obtained during the live event.

17. The method of claim 11, wherein the system is integrated with the wearable AR device, the method further comprising rendering, by the image compensation software code executed by the hardware processor, the AR image on the display.

18. The method of claim 11, wherein the wearable AR device is AR glasses, AR goggles, or an AR headset.

19. The method of claim 11, wherein the model of the venue is a three-dimensional (3D) model obtained from a venue model library.

20. The method of claim 11, wherein the AR image masks the portion of the event that is degraded or obstructed so as to substantially match the first image with the second image.

* * * * *